United States Patent [19]
Mann

[11] 3,943,789
[45] Mar. 16, 1976

[54] DRIVE MECHANISM FOR CEMENT MIXER AND THE LIKE

[75] Inventor: Egon Mann, Friedrichshafen, Germany

[73] Assignee: Zahnradfabrik Friedrichshafen AG, Friedrichshafen, Germany

[22] Filed: Oct. 3, 1974

[21] Appl. No.: 511,678

[30] Foreign Application Priority Data
Oct. 4, 1973  Germany............................ 2349894

[52] U.S. Cl................................. 74/417; 74/421 A
[51] Int. Cl.² ...................... F16H 1/20; F16H 1/12
[58] Field of Search ......... 74/416, 417, 420, 421 A, 74/423

[56] References Cited
UNITED STATES PATENTS

| | | | |
|---|---|---|---|
| 1,142,357 | 6/1915 | Norling | 74/421 A |
| 1,984,414 | 12/1934 | Lee | 74/421 A |
| 2,591,127 | 4/1952 | Brewster | 74/417 |
| 3,175,511 | 3/1965 | Ifield | 91/505 X |
| 3,665,774 | 5/1972 | Bauhus et al. | 74/424 A |
| 3,721,161 | 3/1973 | Bobst | 91/499 |
| 3,817,115 | 6/1974 | Schnizler et al. | 74/417 |
| 5,857,301 | 12/1974 | Hanks et al. | 74/117 |

*Primary Examiner*—John J. Camby
*Attorney, Agent, or Firm*—Karl F. Ross; Herbert Dubno

[57] ABSTRACT

A horizontal load shaft, projecting from a gear housing, is driven from a hydrostatic motor via a bevel pinion meshing with a bevel gear fixed to the shaft inside the housing. The motor and the bevel pinion form a unit detachably mounted on the gear housing, with the bevel pinion projecting inwardly from above.

6 Claims, 2 Drawing Figures

PRIOR ART

DRIVE MECHANISM FOR CEMENT MIXER AND THE LIKE

FIELD OF THE INVENTION

My present invention relates to a drive mechanism designed to rotate a load about a substantially horizontal axis.

BACKGROUND OF THE INVENTION

In certain heavy-duty machinery, such as cement mixers, a generally horizontal load shaft is driven through a speed-reducing gear train from a motor detachably mounted on the gear housing. This mounting is designed to facilitate replacement of worn parts and, with the motor shaft extending laterally into the housing, also enables the same to be constructed in a more compact manner for accommodation in a narrow space, e.g., between the driver's cab and the tumbler of a cement-mixing vehicle. The heavy-duty motor finds a firm support on a seating surface at the top of the gear housing.

In conventional drives of this nature, the gear train includes a bevel pinion journaled in a sleeve which is interposed between the motor and the seating surface of the gear housing. The presence of two separate attachments, namely the pinion mounting and the motor, creates difficulties during assembly since unavoidable manufacturing tolerances introduce dimensional differences which must be compensated with the aid of spacers or shims to ensure a proper mesh between the pinion and the bevel gear driven thereby.

OBJECTS OF THE INVENTION An object of my present invention, therefore, is to provide an improved drive mechanism for the purpose set forth which obviates these problems of assembly and allows persons unskilled in the transmission art, such as the driver of an automotive cement mixer, to make needed replacements on the spot with a minimum loss of operating time.

Another object is to provide a more compact assembly of this nature.

SUMMARY OF THE INVENTION

In accordance with the present invention, I provide a driving unit detachably mounted on the gear housing of a drive mechanism of the aforedescribed type, this unit including a casing for the motor with a peripheral flange resting directly on the seating surface of the housing. A drive shaft positively coupled with the motor extends into the gear housing and carries a bevel pinion meshing with a bevel gear on the load shaft when the detachable unit is in place.

In a preferred construction, the motor is of the hydrostatic type and has an inclined axis, its casing being correspondingly inclined to provide more space between itself and the load.

According to a more particular feature of my invention, the motor casing and the bevel pinion are provided with extensions which form confronting surfaces within the gear housing; an antifriction bearing of the ball or roller type interposed between these surfaces is held under a clamping pressure exerted by fastening means including a nut on a threaded extremity of the drive shaft projecting beyond the pinion, with insertion of a washer or the like between the bearing and one or both of the two confronting surfaces to compensate for manufacturing tolerances. Since the assembly of the motor and the pinion into a unit takes place at the factory, prior to the installation of that unit on the gear housing, no further dimensional adjustment need be carried out by the installer.

BRIEF DESCRIPTION OF THE DRAWING

The above and other features of my invention will now be described in detail with reference to the accompanying drawing in which.

SPECIFIC DESCRIPTION

Figure 1:
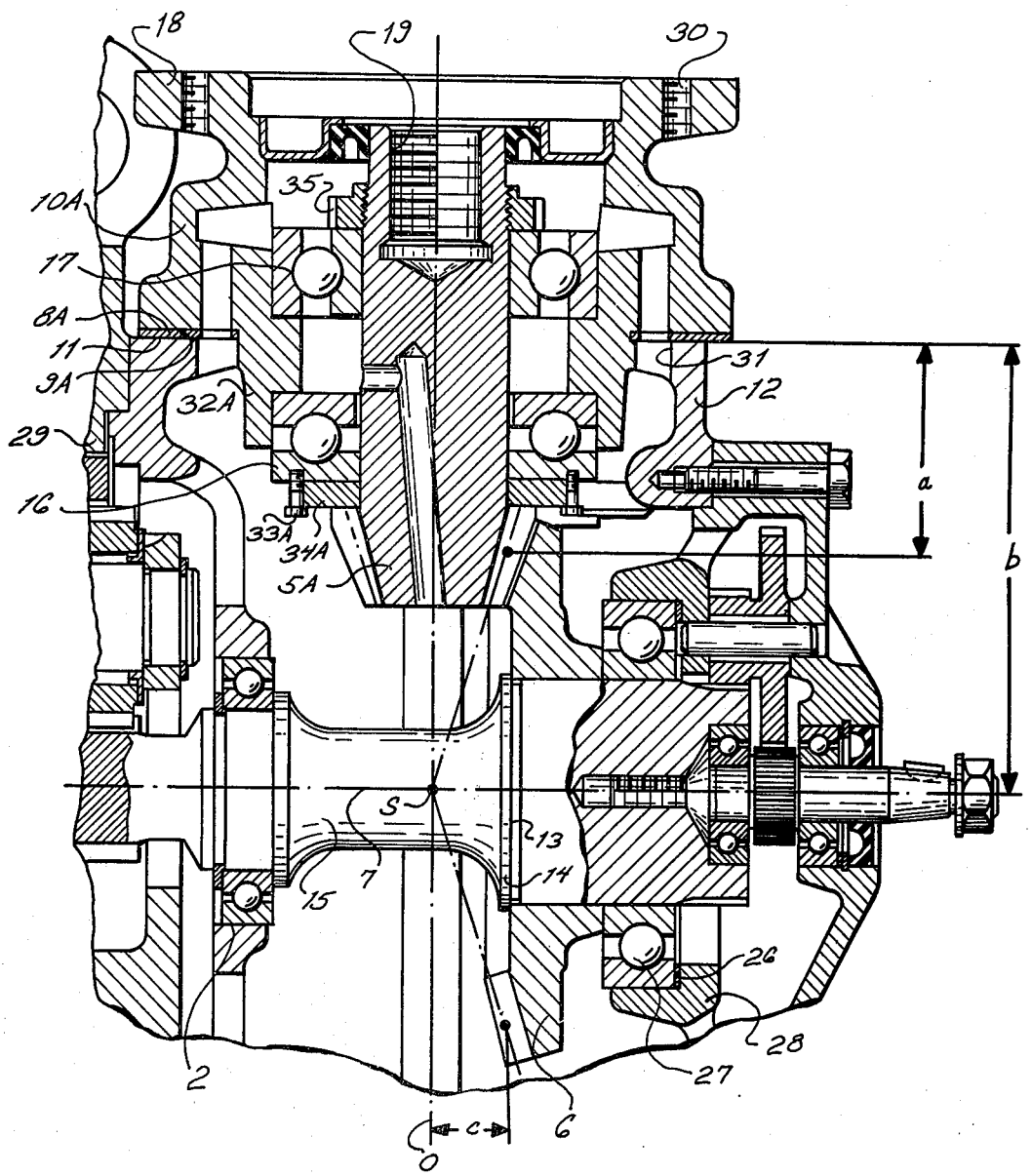
FIG. 1 is a view in sectional elevation of a conventional drive mechanism for a cement mixer.

Reference will first be made to the conventional drive mechanism of FIG. 1 which comprises a gear housing 12 forming at its top an annular seating surface 11 for a sleeve 10A provided at its top with a flange 18. A bevel pinion 5A is journaled in the sleeve 10A, with the aid of ball bearings 16 and 17, for rotation about a vertical axis 0. Flange 18 has threaded bores 30 for screws designed to fasten a nonillustrated motor to it; the motor has a shaft with male threads mating with a threaded bore 19 in the upper end of pinion 5A. This pinion meshes with a large bevel gear 6 which is keyed to a horizontal shaft 15 centered on an axis 7; shaft 15 drives a cantilevered load 29, e.g. a cement-mixing drum or tumbler, illustrated only in part.

Ball bearing 16 has an upper race received in a bottom recess of a collar 32A which integrally depends from sleeve 10A and passes through an aperture 31 of housing 12 surrounded by seating surface 11. The lower race of bearing 16 is secured by screws 33A to a ring 34A which rests on shoulders formed by the projecting teeth of pinion 5A. A knurled nut 35 is threaded onto the upper part of the pinion body and maintains it in fixed position with reference to bearings 16 and 17.

Shaft 15 is journaled in housing 12 with the aid of ball bearings 2 and 27. Bevel gear 6 has a face 13 held against a shoulder 14 of shaft 15 by the bearing 27 and a washer 26 of suitable thickness received in a mounting 28. The position of gear 6 is so chosen that the vertex S of its meshing cone lies at the intersection of axes 0 and 7; this of course, should also be the vertex of the meshing cone of pinion 5A. The distance $c$ of the midplane of the teeth of gear 6 from axis 0 is determined by the width of washer 26. With the spacing $b$ of the seating surface 11 from shaft 7 invariably determined by the dimensions of housing 12, the distance $a$ between that surface and the midplane of the teeth of pinion 5A depends on the depth of insertion of the pinion and can be adjusted, in order to compensate for manufacturing tolerances, by the interposition of a washer 8A of suitable thickness between surface 11 and the confronting surface 9A of sleeve 10A. The choice of a suitable washer is critical and requires a close inspection of the assembled parts. Also, screws (not shown) serving to fasten the collar 10A to housing 12 must pass through this washer.

Figure 2:
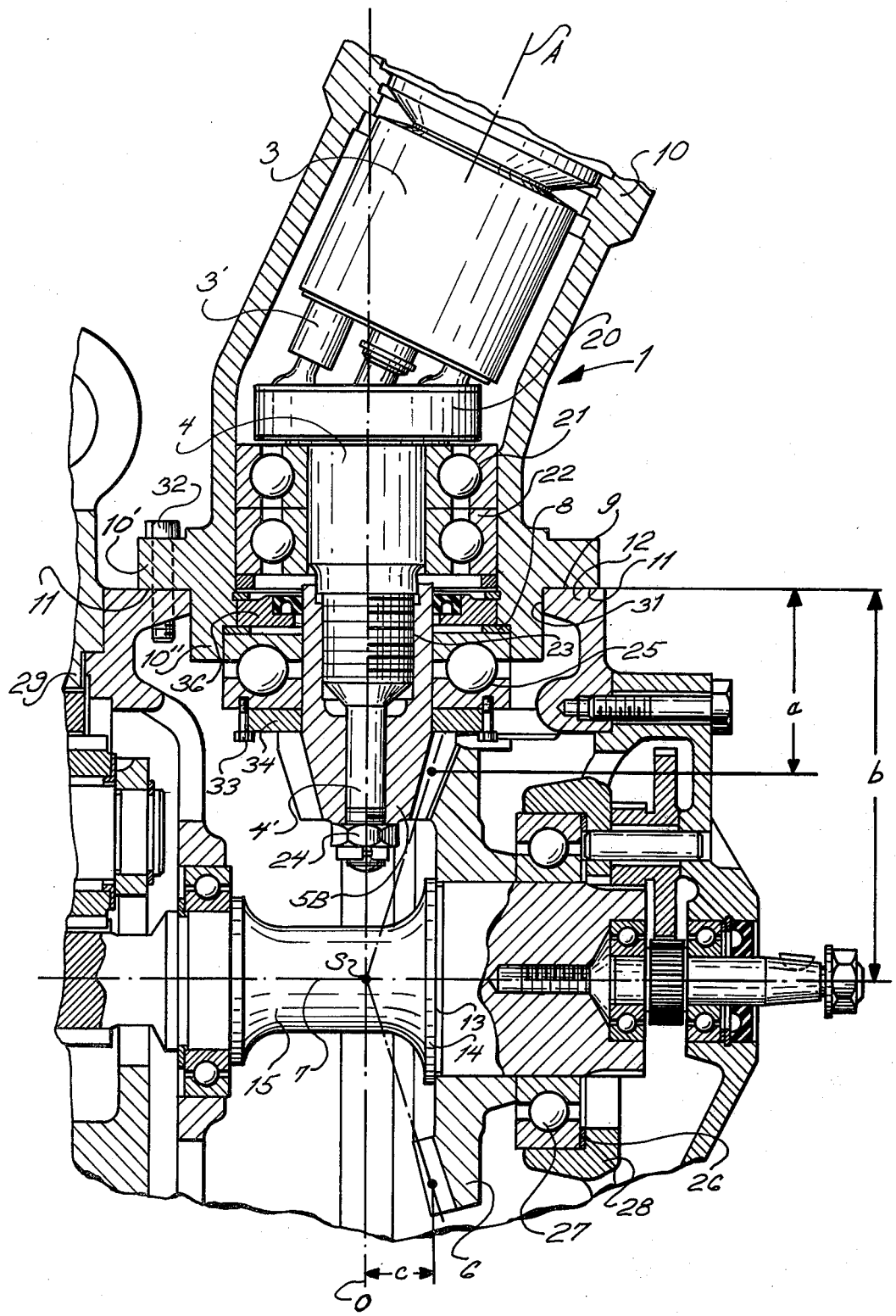
FIG. 2 is a view similar to FIG. 1, showing my present improvement.

In FIG. 2, in which elements corresponding to those of FIG. 1 have been designated by the same reference characters, the construction of gear housing 12 and the parts permanently mounted therein is the same as in FIG. 1. The lower portion of a detachable unit 1 projects through aperture 31 into the gear housing, this portion including a pinion 5B meshing with bevel gear 6. Unit 1 comprises a cylindrical casing 10 which contains a hydrostatic motor 3; plungers 3' of this motor engage a head 20 of a vertical drive shaft 4 which is threadedly fitted into a bore 23 of pinion 5B and is journaled in the lower part of casing 10 by ball bearings 21 and 22. A flange 10' of that casing is directly secured to gear housing 12 by screws 32 (only one shown) received in the same threaded bores which in the conventional system of FIG. 1 accommodate fastening screws for the sleeve 10A. The underside 9 of flange 10' rests on the seating surface 11 without interposition of any shim or washer.

A collar 10'' integral with casing 10 extends through aperture 31 into the gear housing 12 and, with interposition of a washer 8, embraces the upper race of a ball bearing 25 whose lower race is secured by screws 33 to a ring 34 resting on shoulders formed by the teeth of pinion 5B. Ring 34 and collar 10'' form a pair of confronting horizontal surfaces between which the bearing 25 and the washer 8 are held under moderate pressure by the threaded connection between shaft 4 and pinion 5B at bore 23. This connection is maintained by a counternut 24 screwed onto a threaded tip of a reduced shaft end 4' which axially traverses an unthreaded restricted extension of bore 23 in the lower end of the pinion.

With this arrangement, distance $a$ is determined at the factory by choice of a suitable washer 8 and need not concern the person who installs the unit 31 on the gear housing 12. Distances $b$ and $c$ are, of course, fixed as in the prior-art construction of FIG. 1.

Hydrostatic motor 3 has an axis A inclined with reference to axis O in the direction away from the load 29; the surrounding casing 10 slopes in the same direction in its upper part.

A comparison between the structures of FIGS. 1 and 2 will show that, given a motor of similar dimensions in the conventional system, the drive mechanism according to my invention is considerably more compact while being easier to install and to disassemble.

Collar 10'' could, of course, be replaced by equivalent structure, such as an annular array of lugs or ring segments, establishing an upper abutment surface for bearing 25 and washer 8. That washer also helps hold in position a stationary ring 36 forming an oil seal.

I claim:

1. A drive mechanism for a load rotatable about a substantially horizontal axis, comprising:
    a gear housing formed at its top with an aperture surrounded by an annular seating surface;
    a load shaft journaled generally horizontally in said housing and projecting from a side thereof;
    a bevel gear keyed to said load shaft inside said gear housing; and
    a driving unit detachably mounted on said housing, said unit including a casing outside said housing having a peripheral flange resting directly on said seating surface, a motor inside said casing, a drive shaft positively coupled with said motor extending through said aperture into said housing, a bevel pinion on said drive shaft meshing with said bevel gear inside said housing, said drive shaft having a threaded extremity projecting beyond said pinion, said casing and said pinion being provided with extensions forming confronting surfaces in said housing, an antifriction bearing interposed between said extensions, spacing means inserted between said bearing means and one of said confronting surfaces for establishing a predetermined depth of penetration of said pinion into said housing, and fastening means including a nut on said extremity holding said pinion, said bearing and said spacing means in position.

2. A drive mechanism as defined in claim 1 wherein said drive shaft extends at right angles to said load shaft, said motor being centered on an inclined axis and being coupled to an upper end of said drive shaft inside said casing.

3. A drive mechanism as defined in claim 2 wherein said drive shaft is provided with a transverse head inside said casing, said motor having an inclined axis and comprising a set of hydrostatically actuated plungers linked with said head.

4. A drive mechanism as defined in claim 3 wherein said casing slopes upwardly away from a load-carrying extremity of said load shaft.

5. A drive mechanism as defined in claim 1 wherein said spacing means comprises an annular washer.

6. A drive mechanism as defined in claim 5 wherein said washer is interposed between said bearing and the extension of said casing.

* * * * *